United States Patent
Lee et al.

(10) Patent No.: US 7,541,401 B2
(45) Date of Patent: *Jun. 2, 2009

(54) IMPACT MODIFIER FOR A POLYMER COMPOSITION AND METHOD FOR PREPARING THE SAME

(75) Inventors: Han Su Lee, Seoul (KR); Byeong Do Lee, Uiwang-si (KR); Sung Sig Min, Seoul (KR); Byung Choon Lee, Seoul (KR)

(73) Assignee: Cheil Industries Inc., Gumi-si (KR)

( * ) Notice: Subject to any disclaimer, the term of this patent is extended or adjusted under 35 U.S.C. 154(b) by 263 days.

This patent is subject to a terminal disclaimer.

(21) Appl. No.: 11/323,646

(22) Filed: Dec. 28, 2005

(65) Prior Publication Data

US 2006/0148946 A1   Jul. 6, 2006

(30) Foreign Application Priority Data

Dec. 31, 2004   (KR) .................. 10-2004-0117912
Jun. 15, 2005   (WO) .............. PCT/KR2005/001831
Sep. 5, 2005    (KR) .................. 10-2005-0082275

(51) Int. Cl.
    *C08K 5/5419* (2006.01)
    *C08G 77/442* (2006.01)

(52) U.S. Cl. .............. 524/268; 525/100; 525/101; 525/106; 526/279; 528/25

(58) Field of Classification Search .................. None
    See application file for complete search history.

(56) References Cited

U.S. PATENT DOCUMENTS

| | | | |
|---|---|---|---|
| 4,994,522 A | 2/1991 | Sasaki et al. | |
| 5,106,908 A * | 4/1992 | Alsmarraie et al. | 525/105 |
| 5,132,359 A | 7/1992 | Sasaki et al. | |
| 6,153,694 A | 11/2000 | Miyatake et al. | |
| 6,169,149 B1 | 1/2001 | Craig et al. | |
| 6,596,810 B1 | 7/2003 | Hatke et al. | |
| 2005/0038149 A1 * | 2/2005 | Hashimoto et al. | 524/261 |

FOREIGN PATENT DOCUMENTS

| | | |
|---|---|---|
| EP | 0 326 038 | 8/1989 |
| JP | 6116470 | 4/1994 |
| JP | 09-157484 A | 6/1997 |
| JP | 2001-059006 | 3/2001 |
| JP | 2002-020443 | 1/2002 |
| JP | 2004-331726 | 11/2004 |
| KR | 2004-0090386 | 10/2004 |
| KR | 2004-95402 A | 11/2004 |
| KR | 2005-15088 A | 2/2005 |
| KR | 2005-49127 A | 5/2005 |
| KR | 2005-0049973 | 5/2005 |
| KR | 2005-0060604 | 6/2005 |
| WO | WO 00/34346 | 6/2000 |
| WO | WO 03/068835 * | 8/2003 |

* cited by examiner

*Primary Examiner*—Marc S Zimmer
(74) *Attorney, Agent, or Firm*—Summa, Additon & Ashe, P.A.

(57) ABSTRACT

Disclosed herein is an impact modifier for a polymer composition and a method of preparing the same. The impact modifier includes a core comprising a polyorganosiloxane, an acrylate polymer and a styrenic polymer; and a shell generally surrounding the core, the shell comprising a polymer attached to the core. The method includes providing a silicone rubber particle; adding a polymerizable styrenic compound into the silicone rubber particle; polymerizing the polymerizable styrenic compound within the particle to provide a styrenic polymer; adding a polymerizable acrylic compound into the silicone rubber particle; polymerizing the polymerizable acrylic compound within the silicone rubber particle to provide an acrylate polymer; and grafting a polymerizable compound onto the silicone rubber particle to provide a shell substantially surrounding the silicone rubber particle comprising the styrenic polymer and the acrylate polymer.

42 Claims, No Drawings

IMPACT MODIFIER FOR A POLYMER COMPOSITION AND METHOD FOR PREPARING THE SAME

CROSS-REFERENCE TO RELATED APPLICATIONS

This application claims the benefit of Korean Patent Application Nos. 2004-117912, filed on Dec. 31, 2004 and 2005-82275, filed on Sep. 5, 2005, in the Korean Intellectual Property Office, the disclosures of which are incorporated herein by reference. This application also claims priority to International Application No. PCT/KR2005/001831, filed on Jun. 15, 2005 under the Patent Cooperation Treaty (PCT), designating the U.S.

BACKGROUND OF THE INVENTION

1. Field of the Invention

The present invention relates to an impact modifier for a polymer composition. More particularly, the present invention relates to an impact modifier for a polycarbonate resin composition, which provides enhanced coloration and impact resistance.

2. Description of the Related Technology

Generally, a polycarbonate resin has excellent impact strength, self-extinguishment, dimension stability and heat resistance. Thus, a polycarbonate resin has been widely used as a housing material for various electronic or electric devices.

However, a polycarbonate resin has poor flowability due to its high melting point. Thus, the resin requires a high temperature for processing. Such a high processing temperature causes a resulting product to have deteriorated impact resistance. To avoid this problem, a polycarbonate resin is typically used in mixture with various impact modifiers.

Although impact modifiers improve the impact strength of a polycarbonate resin, such impact modifiers causes other problems. For instance, a butadiene rubber-based impact modifier commonly used in a polycarbonate resin tends to be degraded or scorched during a molding process of over 300° C. This problem causes deterioration of heat stability and weather resistance, thereby limiting application of the impact modifier. An acrylate rubber-based impact modifier generally provides good heat stability and weather resistance. However, it shows poor coloration property and impact resistance at a low temperature.

SUMMARY OF CERTAIN INVENTIVE ASPECTS

One aspect of the invention provides an impact modifier. The impact modifier for a polymer composition comprises: a core comprising a polyorganosiloxane, an acrylate polymer and a styrenic polymer; and a shell generally surrounding the core, the shell comprising a polymer attached to the core.

In the impact modifier, the core may comprise a copolymer comprising an acrylate moiety and a styrenic moiety. The core may be substantially free of a copolymer comprising an acrylate moiety and a styrenic moiety. The polyorganosiloxane may comprise at least one of a C1-C4 linear or branched alkyl and an aryl. The polyorganosiloxane may comprise methyl. The polyorganosiloxane may comprise phenyl. The polyorganosiloxane may be selected from the group consisting of polydimethylsiloxane, polydiphenylsiloxane, polymethylphenylsiloxane, polymethacryloyloxypropylsiloxane and a copolymer of at least two of the foregoing. The acrylate polymer may comprise an alkylacrylate. The acrylate polymer may comprise a butylacrylate. The styrenic polymer is selected from the group consisting of styrene, α-methylstyrene, divinylbenzene and vinyltoluene. The shell may comprise a polymer comprising a substituted or unsubstituted vinyl moiety. The impact modifier has a reflective index from about 1.49 to about 1.59.

Another aspect of the invention provides a method of making an impact modifier. The method comprises: providing a polyorganosiloxane particle; adding a polymerizable styrenic compound into the polyorganosiloxane particle; polymerizing the polymerizable styrenic compound within the particle to provide a styrenic polymer; adding a polymerizable acrylic compound into the polyorganosiloxane particle; polymerizing the polymerizable acrylic compound within the polyorganosiloxane particle to provide an acrylate polymer; and grafting a polymerizable compound onto the polyorganosiloxane particle to provide a shell substantially surrounding the polyorganosiloxane particle comprising the styrenic polymer and the acrylate polymer.

In the method, providing the polyorganosiloxane particle may comprise providing an emulsion of the polyorganosiloxane particle in an aqueous solvent. The polyorganosiloxane may comprise at least one of a C1-C4 linear or branched alkyl and an aryl. The polyorganosiloxane may be selected from the group consisting of polydimethylsiloxane, polydiphenylsiloxane, polymethylphenylsiloxane, polymethacryloyloxypropylsiloxane and a copolymer of at least two of the foregoing. The polymerizable styrenic compound is selected from the group consisting of styrene, α-methylstyrene, divinylbenzene and vinyltoluene. The polymerizable acrylic compound may comprise an alkylacrylate. The polymerizable acrylic compound may comprise a butylacrylate. The polymerizable compound may comprise a monomer or oligomer comprising a substituted or unsubstituted vinyl moiety. The polymerizable styrenic compound and the polymerizable acrylic compound may be simultaneously polymerized within the polyorganosiloxane particle, thereby further providing a co-polymer comprising an acrylate moiety and a styrenic moiety. In the method, polymerizing the polymerizable styrenic compound and polymerizing the polymerizable acrylic compound may be carried out at different times, thereby the resulting impact modifier is substantially free of a copolymer comprising an acrylate moiety and a styrenic moiety.

Another aspect of the invention provides a polymer composition comprising: a polymer compound; and the impact modifier described above. The polymer compound may comprise a thermoplastic resin. The thermoplastic resin may be selected from the group consisting of a vinyl chloride resin, a styrenic resin, a styrene-acrylonitrile resin, an acrylic resin, a polyester resin, an ABS resin and a polycarbonate resin. The impact modifier may have a reflective index from about 1.49 to about 1.59 before being mixed with the polymer compound. The composition may have a shape configured to substantially enclose an electronic circuit.

Another aspect of the invention provides a method of making a polymer composition. The method comprises: providing the impact modifier described above; providing a polymer compound; and mixing the polymer compound and the impact modifier, thereby providing a polymer composition.

Another aspect of the invention provides a polymer composition made by the method described above.

Another aspect of the invention provides an electronic device, comprising: an electronic circuit; and a housing generally enclosing the electronic circuit, the housing comprising a portion, wherein the portion comprises a polymer composition which comprises a polymer compound and the impact modifier described above.

Another aspect of the invention provides a method of making an electronic device. The method comprises: providing an electronic circuit; and providing a housing generally enclosing the electronic circuit, the housing comprising a portion, wherein the portion comprises a polymer composition which comprises a polymer compound and the impact modifier described above.

Another aspect of the invention provides a housing for an electronic device comprising: a portion which may comprise a polymer composition, wherein the portion comprises a polymer compound and the impact modifier described above. The polymer may comprise a polycarbonate resin.

Another aspect of the invention provides an impact modifier comprising: (A) a rubber core prepared by two-step swelling polymerization consisting of the first step of carrying out the swelling polymerization by adding a styrenic aromatic compound to an organosiloxane cross-linked (co)polymer having a particle size of between about 50 and about 400 nm and the second step of carrying out the swelling polymerization by adding an alkylacrylate and a cross-linking agent to a polymer obtained by said first step; and (B) a plastic shell consisting of a vinyl (co)polymer prepared by graft (co)polymerizing a vinyl monomer onto the rubber core; wherein the refractive index of the impact modifier is between about 1.49 and about 1.59.

In the impact modifier, the organosiloxane cross-linked (co)polymer may contain an aromatic group and has the refractive index of between 1.41 and about 1.50. The amount of the organosiloxane cross-linked (co)polymer may be between about 5 and about 90 parts by weight. The amount of the styrenic aromatic compound may be between 0.01 and about 50 parts by weight. The amount of the alkyl acrylate may be between about 5 and about 90 parts by weight. The amount of the (co)polymer of the vinyl monomer may be between about 5 and about 90 parts by weight.

The organosiloxane may be selected from the group consisting of dimethylsiloxane, methylphenylsiloxane, diphenylsiloxane and a mixture or a copolymer thereof. The styrenic aromatic compound may be selected from the group consisting of styrene, α-methylstyrene, divinylbenzene and vinyltoluene. The alkylacrylate may be selected from the group consisting of methylacrylate, ethylacrylate and n-butylacrylate. The vinyl monomer may be selected from the group consisting of methylmethacylate, styrene, acrylonitrile and a mixture thereof. The cross-linking agent may be allyl methacrylate or triallyl isocyanurate. The weight ratio of the rubber core (A) to the plastic shell (B) may be between about 5:5 and about 9:1.

Another aspect of the invention provides a method of preparing the impact modifier. The method comprises: preparing a rubber core through two-step swelling polymerization consisting of the first step of carrying out the swelling polymerization by adding a styrenic aromatic compound to an organosiloxane cross-linked (co)polymer having a particle size of 50-400 nm at 50-100° C. and the second step of carrying out the swelling polymerization through cross polymerizing at 50-100° C. by adding an alkylacrylate and a cross-linking agent to a polymer obtained by said first step; and graft (co)polymerizing a vinyl monomer onto the rubber core to form a plastic shell.

Yet another aspect of the invention provides a thermoplastic resin composition employing the impact modifier as described above. The thermoplastic resin may be selected from the group consisting of a vinyl chloride resin, a styrenic resin, a styrene-acrylonitrile resin, an acrylic resin, a polyester resin, an ABS resin and a polycarbonate resin. The thermoplastic resin may be a polycarbonate resin. The impact modifier may be blended into the composition in an amount of between about 0.5 and about 30 parts by weight per 100 parts by weight of the polycarbonate resin.

DETAILED DESCRIPTION OF CERTAIN INVENTIVE EMBODIMENTS

Various aspects and features of the invention will become more fully apparent from the following description and appended claims.

In one embodiment, an impact modifier for a polymer composition includes a core and a shell generally surrounding the core. The core includes a polyorganosiloxane, an acrylate polymer and a styrenic polymer. The polyorganosiloxane may also be referred to as "silicone rubber." The shell includes a polymer attached to the core.

The impact modifier described above may be prepared by the following method. The method includes: providing a silicone rubber particle; adding a polymerizable styrenic compound into the silicone rubber particle; polymerizing the polymerizable styrenic compound within the particle to provide a styrenic polymer; adding a polymerizable acrylic compound into the silicone rubber particle; polymerizing the polymerizable acrylic compound within the silicone rubber particle to provide an acrylate polymer; and grafting a polymerizable compound onto the silicone rubber particle to provide a shell substantially surrounding the silicone rubber particle comprising the styrenic polymer and the acrylate polymer.

The polymer composition for which the impact modifier is used is widely applicable as a housing material for electronic devices. The impact modifier is mixed with a polymer resin to form the polymer composition. In one embodiment, the polymer resin is a polycarbonate resin.

Impact Modifier

An impact modifier according to an embodiment includes a core and a shell generally surrounding the core. The core may also be referred to as "rubber core." The shell may also be referred to as "plastic shell." Each of the core and the shell will be described below in detail.

(A) Core

In one embodiment, the core includes a polyorganosiloxane, an acrylate polymer and a styrenic polymer. The polyorganosiloxane is also referred to as "silicone rubber." In one embodiment, the core may also have a copolymer including an acrylate moiety and a styrenic moiety. In other embodiments, the core may be substantially free of a copolymer including an acrylate moiety and a styrenic moiety.

In one embodiment, the polyorganosiloxane includes at least one of a C1-C4 linear or branched alkyl, an aryl and methacryloyloxypropyl. In an embodiment, the alkyl may be methyl. The aryl may be phenyl. Examples of the polyorganosiloxane include, but are not limited to, polydimethylsiloxane, polydiphenylsiloxane, polymethylphenylsiloxane, and polymethacryloyloxypropylsiloxane.

In certain embodiments, the polyorganosiloxane may be a copolymer of at least two of monomers for forming the foregoing polyorganosiloxanes. Examples of monomeric compounds for forming the organosiloxane copolymer include, but are not limited to, dimethylsiloxane, methylphenylsiloxane, and diphenylsiloxane. An exemplary copolymer is dimethylsiloxane-diphenylsiloxane copolymer. Such a copolymer has a cross-linked structure. The cross-linked structure may allow the impact modifier to provide enhanced impact resistance and coloration, and stable morphology. The cross-linked structure may also prevent the polyorganosiloxane from diffusing into a surface of a product for which the impact modifier is used.

A degree of cross-linking in the polyorganosiloxane may be determined by solubility of the polyorganosiloxane in an organic solvent. The less soluble in an organic solvent, the higher the degree of cross-linking is. Examples of the organic solvent include acetone and toluene. Thus, a polyorganosiloxane having a cross-linked structure has an insoluble portion when dissolved in toluene or acetone. In one embodiment, the content of an insoluble portion of the polyorganosiloxane in toluene is more than 30 wt % with reference to the total weight of the polyorganosiloxane.

In certain embodiments, the polyorganosiloxane has a refractive index of between about 1.41 and about 1.50, optionally between about 1.42 and about 1.45. A polydimethylsiloxane has a refractive index of between about 1.39 and about 1.405. A polyorganosiloxane comprising an aryl group can have a refractive index of between about 1.41 and about 1.50. An exemplary aryl group is phenyl. In addition, the polyorganosiloxane may have a particle size of between about 50 nm and about 400 nm.

The core also includes an acrylate polymer. In certain embodiments, the acrylate polymer may be a crosslinked acrylate polymer. Examples of monomers for forming the acrylate polymer include, but are not limited to, an alkylacrylate such as methylacrylate, ethylacrylate, and butylacrylate. In one embodiment, butylacrylate may be n-butylacrylate, which provides a low glass transition temperature.

In addition, the core includes a styrenic polymer. Examples of monomers for forming the styrenic polymer include, but are not limited to, an aromatic styrenic compound such as styrene, α-methylstyrene, divinylbenzene, and vinyltoluene. In one embodiment, styrene is used as a monomer for the styrenic polymer.

In one embodiment, a weight ratio of the polyorganosiloxane to the acrylate polymer is between about 1:6 and about 6:1, optionally between about 1:6 and about 1:1. A weight ratio of the styrenic polymer to the acrylate copolymer may be between about 1:20 and about 1:1, optionally between about 1:15 and about 1:4.

The styrenic compound and the alkylacrylate copolymer maintain the glass transition temperature of the impact modifier at between about −10° C. and about −40° C. which is the range of the glass transition temperature of the alkylacrylate copolymer. The glass transition temperature is kept throughout two swelling polymerization steps in the presence of a polyorganosiloxane.

(B) Shell

The impact modifier also includes a shell generally surrounding the core described above. In one embodiment, the shell may be a vinyl polymer or copolymer. The shell generally covers and surrounds the surface of the core. The shell is formed on the surface by graft-copolymerizing a vinyl monomer or oligomer onto the surface of the core.

Examples of the vinyl monomer include, but are not limited to, alkylmethacrylate, acrylate and ethylenically unsaturated aromatic compound. In one embodiment, the vinyl monomer may be methylmethacylate, styrene, acrylonitrile or a mixture of two or more of the foregoing.

In one embodiment, a weight ratio of the core to the shell ranges from about 5:5 to about 9:1, optionally from about 6:4 to about 8:2. The impact modifier may have a refractive index ranging from about 1.49 to about 1.59, optionally from about 1.50 to about 1.57.

Preparation of Impact Modifier

A method of preparing the impact modifier described above will be described below in detail. The method includes forming the core and grafting a polymerizable compound onto the core.

(A) Core Preparation

In one embodiment, the core is prepared by providing a polyorganosiloxane particle and subsequently conducting two polymerization steps. The polyorganosiloxane may also be referred to as "silicone rubber." First, a polyorganosiloxane particle is provided. In one embodiment, the polyorganosiloxane is provided in a dispersion state. The polyorganosiloxane in a dispersion state may also be referred to as "silicone latex." The polyorganosiloxane in a dispersion state is prepared by dispersing a solid polyorganosiloxane in ion-exchanged water in the presence of an emulsifier.

In one embodiment, the polyorganosiloxane may be dimethylsiloxane, methylphenylsiloxane, diphenylsiloxane, and a mixture or a copolymer of the foregoing. In an embodiment, the polyorganosiloxane is in an amount of between about 5 and about 90 parts by weight, optionally between about 10 and about 50 parts by weight with reference to the total weight of the impact modifier. In one embodiment, the polyorganosiloxane has a particle size of between about 50 nm and about 400 nm, optionally between about 100 nm and about 350 nm. The polyorganosiloxane may have a refractive index of between about 1.41 and about 1.50, optionally between about 1.42 and 1.45.

The emulsifier may be an anionic emulsifier such as a sodium, potassium, or ammonium salt of alkylsulfate containing about 4 to about 30 carbon atoms. Examples of the emulsifier include, but are not limited to, sodium dodecyl sulfate and sodium dodecylbenzene sulfate. Among them, sodium dodecylbenzene sulfate is applicable to a wide range of acidity or pH. The emulsifier may be in an amount of between about 0.1 and about 5 parts by weight, optionally between about 0.1 and about 2 parts by weight with reference to the total weight of the impact modifier.

Next, a first and a second swelling polymerization steps are conducted. In the first swelling polymerization step, a styrenic polymer is formed within the polyorganosiloxane particle. In the second swelling polymerization step, an acrylate polymer is formed within the polyorganosiloxane particle which contains the styrenic polymer. In other embodiments, the first and the second steps may be switched with each other. "Swelling polymerization," as used herein, refers to a polymerization process in which polymerizable monomers or oligomers are added into seed polymer particles and then are polymerized within the polymer particles. During the process, the polymerizable monomers are swelled into the polymer particles. Then, polymerization takes place in such a way that they grow into polymer particles of the desired size.

The first swelling polymerization step is conducted by adding a polymerizable styrenic compound into the polyorganosiloxane particle and polymerizing the polymerizable styrenic compound within the particle to provide a styrenic polymer. In one embodiment, a styrenic aromatic compound is added to the silicone latex under nitrogen stream. Then, the mixture is heated to a temperature of between about 50° C. and about 100° C. By the foregoing treatment, the styrenic aromatic compound is swelled into the polyorganosiloxane. Subsequently, polymerization is initiated by adding a polymerization initiator. The polymerization may be conducted at a temperature of between about 50° C. and about 100° C. After the polymerization has been completed, the mixture solution is cooled down to room temperature.

Examples of the styrenic aromatic compound include, but are not limited to, styrene, α-methylstyrene, divinylbenzene, vinyltoluene and the mixture thereof. The styrenic aromatic compound may be in an amount of between about 0.01 and about 50 parts by weight, optionally between about 1 and about 30 parts by weight with reference to the total weight of the impact modifier.

The second swelling polymerization step is conducted by adding a polymerizable acrylic compound into the polyorganosiloxane particle resulting from the first polymerization step and polymerizing the polymerizable acrylic compound within the polyorganosiloxane particle to provide an acrylate polymer. In one embodiment, an alkyl acrylate monomer and a cross-linking agent are added to the polyorganosiloxane particle under nitrogen stream. The mixture may be heated to a temperature of between about 50° C. and about 100° C. By the foregoing treatment, the alkyl acrylate monomer is swelled into the polyorganosiloxane. Next, polymerization is initiated by adding a polymerization initiator. The polymerization may be carried out at a temperature of between about 50° C. and about 100° C.

Examples of the alkylacrylate monomer include, but are not limited to, methylacrylate, ethylacrylate, and n-butylacrylate. n-butyl acrylate has been shown to provide a low glass transition temperature. In one embodiment, the alkylacrylate monomer is in an amount of between about 5 and about 90 parts by weight, optionally between about 10 and about 50 parts by weight with reference to the total weight of the impact modifier.

Examples of the crosslinking agent include, but are not limited to, allyl methacrylate, triallyl cyanurate, triallyl isocyanurate, and divinylbenzene. The crosslinking agent may be in an amount of between about 0.01 and about 10 parts by weight, optionally between about 0.01 and about 5 parts by weight with reference to the total weight of the impact modifier.

The polymerization initiator may be a free-radical initiator which generates free-radicals through thermal decomposition or oxidation-reduction reaction. Examples of the polymerization initiators include potassium persulfate, magnesium persulfate, benzoyl peroxide, hydrogen peroxide, dibenzyl peroxide, cumene hydroperoxide, and tert-butyl hydroperoxide. In one embodiment, a water-soluble initiator such as potassium persulfate may be used. The polymerization initiator may be in an amount of between about 0.1 and about 5 parts by weight, optionally between about 0.1 and about 2 parts by weight with reference to the total weight of the impact modifier.

The method described above substantially prevents a copolymer including an acrylate moiety and a styrenic moiety from being produced during the two polymerization steps. Thus, the resulting impact modifier is substantially free of a copolymer including an acrylate moiety and a styrenic moiety. In certain embodiments, however, the polymerizable styrenic compound and the polymerizable acrylic compound may be simultaneously added into the polyorganosiloxane particle. This simultaneous addition of the two compounds further provides a copolymer comprising an acrylate moiety and a styrenic moiety in the polyorganosiloxane.

(B) Shell Preparation

Next, a polymerizable compound is grafted onto the core particle resulting from the above step. This grafting step provides a shell substantially surrounding the core particle. In one embodiment, a vinyl monomer or oligomer is graft-polymerized onto the rubber core to form a plastic shell. For the graft-polymerization, a polymerization initiator and a vinyl monomer may be added dropwise continuously to the core particle. This step may be conducted at a temperature of between about 50° C. and about 100° C. Next, coagulation is carried out by adding a coagulating agent to the resulting compound. Subsequently, filtration is conducted to provide the impact modifier in a powder form.

Examples of the vinyl monomer include, but are not limited to, alkylmethacrylate, acrylate and an ethylenically unsaturated aromatic compound. In one embodiment, the vinyl monomer may be methylmethacylate, styrene, acrylonitrile or a mixture of two or more of the foregoing. The vinyl monomer in an embodiment is in an amount of between about 5 and about 90 parts by weight, optionally between about 10 and about 50 parts by weight with reference to the total weight of the impact modifier. The coagulating agent may be a metal salt such as magnesium chloride, calcium chloride, magnesium sulfate, and calcium sulfate.

The impact modifier obtained by the method described above has a high refractive index of between about 1.49 and about 1.59. The impact modifier can provide excellent coloration and impact resistance even at a low temperature.

Polymer Composition

Another aspect of the invention provides a polymer composition including a polymer and the impact modifier described above. In one embodiment, the polymer may be a thermoplastic resin. Examples of the thermoplastic resin include, but are not limited to, a vinyl chloride resin, a styrenic resin, a styrene-acrylonitrile resin, an acrylic resin, a polyester resin, an ABS resin, and a polycarbonate resin. The impact modifier, when used with a polycarbonate resin, provides excellent coloration and impact resistance even at a low temperature.

In one embodiment, a polymer composition may include a polycarbonate resin and the impact modifier. In the composition, the impact modifier may be in an amount of between about 0.5 and about 30 parts by weight per 100 parts by weight of the polycarbonate resin. The polycarbonate resin composition may be used as a housing material for an electronic device.

Electronic Devices

Another aspect of the invention provides an electronic device. The electronic device includes an electronic circuit and a housing generally enclosing the electronic circuit. The housing includes a portion which comprises a polymer composition. The polymer composition includes a polymer compound and the impact modifier as described above.

The electronic device may include, but is not limited to, consumer electronic products, electronic circuit components, parts of the consumer electronic products, electronic test equipments, etc. The consumer electronic products may include, but are not limited to, a mobile phone, a telephone, a television, a computer monitor, a computer, a hand-held computer, a personal digital assistant (PDA), a microwave, a refrigerator, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi functional peripheral device, etc.

A better understanding of the invention may be obtained in light of the following examples which are set forth to illustrate, but are not to be construed to limit the invention.

EXAMPLE 1

First, a rubber core was prepared by the following process. A silicone latex was prepared by dispersing (i) 90 g of dimethylsiloxane-diphenylsiloxane cross-linked copolymer having 1 wt % of 3-methacryloyloxypropyl group, a refractive index of 1.429, a particle size of 220 nm and 65 wt % of an insoluble portion in toluene and (ii) 3.2 g of sodium dodecylbenzene sulfate in 970 g ion-exchanged water. Next, 36 g of styrene was added to the silicone latex. The mixture was stirred with it at room temperature for 1 hour. The mixture was heated to 75° C. The mixture was mixed with a solution of 0.4 g of potassium persulfate in 22.5 g ion-exchanged water. The mixture was maintained at a temperature of 75° C. for 2 hours. The mixture was cooled to room temperature. To the mixture, 190 g of n-butylacrylate and 9 g of triallyl isocyanurate were added. Then, the mixture was stirred at room temperature for 1 hour. The mixture was heated to 75° C. again, and then was added to a solution of 0.4 g of potassium persulfate in 22.5 g ion-exchanged water. The mixture was maintained at a temperature of 75° C. for 2 hours.

Next, a shell was formed onto the rubber core as follows. The mixture resulting from the above process was mixed with a solution of 0.7 g of potassium persulfate in 22.5 g ion-exchanged water. Then, 135 g of a styrene solution was added dropwise to the mixture for 15 minutes. The mixture was allowed for reaction for 4 hours at 75° C. Then, the mixture was cooled to room temperature. The conversion was 96.8%. The resulting latex was coagulated in a 1.5% aqueous $MgSO_4$ solution at 75° C. Then, the coagulated latex was washed and was dried to obtain an impact modifier in a powder form.

EXAMPLE 2

In Example 2, a rubber core was prepared in the same manner as in Example 1. Next, a shell was formed on the rubber core as follows. The resulting mixture containing the rubber core was mixed with a solution of 0.7 g of potassium persulfate in 22.5 g ion-exchanged water. Then, a solution including 101.25 g of styrene and 33.75 g of acrylonitrile was added dropwise to the mixture for 15 minutes. The mixture was allowed for reaction for 4 hours at 75° C. Then, the mixture was cooled to room temperature. The conversion was 96.3%. The resulting latex was coagulated in a 1.5% aqueous $MgSO_4$ solution at 75° C. Then, the coagulated latex was washed and dried to obtain an impact modifier in a powder form.

EXAMPLE 3

First, a rubber core was prepared by the following process. A silicone latex was prepared by dispersing (i) 90 g of dimethylsiloxane-diphenylsiloxane cross-linked copolymer having 1 wt % of 3-methacryloyloxypropyl group, a refractive index of 1.424, a particle size of 295 nm and 60% of an insoluble portion in toluene and (ii) 3.2 g of sodium dodecylbenzene sulfate in 970 g ion-exchanged water. To the silicone latex, 22.5 g of styrene was added. Then, the mixture was stirred at room temperature for 1 hour. The mixture was heated to 75° C. The mixture was added to a solution of 0.3 g of potassium persulfate in 6.4 g ion-exchanged water. The mixture was maintained at a temperature of 75° C. for 1 hour. The mixture was cooled to 50° C. 202.5 g of n-butyl acrylate and 2.5 g of triallyl isocyanurate were added to the mixture. Then, the mixture was stirred for 1 hour. The mixture was heated to 75° C. again, and then was mixed with a solution of 1.5 g of potassium persulfate in 32.5 g ion-exchanged water. The mixture was maintained at a temperature of 75° C. for 2 hours to obtain a rubber core.

Next, a shell was formed onto the rubber core as follows. The mixture was mixed with a solution of 1 g of potassium persulfate in 21 g ion-exchanged water. Next, 135 g of a styrene solution was added dropwise for 30 minutes. The mixture was allowed for reaction for 2 hours at 75° C. Then, the mixture was cooled to room temperature. The conversion was 97.2%. The resulting latex was coagulated in a 1.5% aqueous $MgSO_4$ solution at 75° C. Then, the coagulated latex was washed and dried to obtain an impact modifier in a powder form.

EXAMPLE 4

First, a rubber core was prepared by the following process. A silicone latex was prepared by dispersing (i) 90 g of dimethylsiloxane-diphenylsiloxane cross-linked copolymer having 1 wt % of 3-methacryloyloxypropyl group, a refractive index of 1.429, a particle size of 198 nm and 630% of an insoluble portion in toluene and (ii) 3.2 g of sodium dodecylbenzene sulfate in 970 g ion-exchanged water. To the silicone latex, 22.5 g of styrene was added and mixed at room temperature for 1 hour. The mixture was heated to 75° C. The mixture was mixed with a solution of 0.3 g of potassium persulfate in 6.4 g ion-exchanged water. The mixture was maintained at a temperature of 75° C. for 1 hour. The mixture was cooled to 50° C. To the mixture, 189 g of n-butylacrylate and 9 g of allylmethacrylate were added. Then, the mixture was stirred for 1 hour. The mixture was heated to 75° C. again, and then was mixed with a solution of 1.5 g of potassium persulfate in 32.5 g ion-exchanged water. The mixture was maintained at a temperature of 75° C. for 2 hours to obtain a rubber core.

Next, a shell was formed onto the rubber core as follows. The mixture was mixed with a solution of 1 g of potassium persulfate in 21 g ion-exchanged water. Next, 135 g of a styrene solution was dropwise added to the mixture for 30 minutes. The mixture was allowed for reaction for 2 hours at 75° C. Then, the mixture was cooled to room temperature. The conversion was 93.9%. The resulting latex was coagulated in a 1.5% aqueous $MgSO_4$ solution at 75° C. Then, the coagulated latex was washed and dried to obtain an impact modifier in a powder form.

COMPARATIVE EXAMPLE 1

First, a rubber core was prepared by the following process. A silicone latex was prepared by dispersing (i) 90 g of dimethylsiloxane-diphenylsiloxane cross-linked copolymer having 1 wt % of 3-methacryloyloxypropyl group, a refractive index of 1.429, a particle size of 220 nm and 65% of an insoluble portion in toluene and (ii) 3.2 g of sodium dodecylbenzene sulfate in 970 g ion-exchanged water. To the silicone latex, 36 g of styrene and 190 g of n-butyl acrylate and 9 g of triallyl isocyanurate were added and mixed at room temperature for 1 hour. The mixture was heated to 75° C. The mixture was mixed with a solution of 1.8 g of potassium persulfate in 45 g ion-exchanged water. The mixture was maintained at a temperature of 75° C. for 4 hours to obtain a rubber core.

Next, a shell was formed onto the rubber core as follows. The mixture was mixed with a solution of 0.7 g of potassium persulfate in 22.5 g ion-exchanged water. Then, a solution including 101.25 g of styrene and 33.75 g of acrylonitrile was added dropwise to the mixture for 15 minutes. The mixture was allowed for reaction for 4 hours at 75° C. Then, the mixture was cooled to room temperature. The conversion was 96.6%. The resulting latex was coagulated in a 1.5% aqueous $MgSO_4$ solution at 75° C. Then, the coagulated latex was washed and dried to obtain an impact modifier in a powder form.

COMPARATIVE EXAMPLE 2

In Comparative Example 2, a rubber core was prepared in the same manner as in Example 1. Next, a shell was formed on the rubber core as follows. The resulting mixture was mixed with a solution of 0.7 g of potassium persulfate in 22.5 g ion-exchanged water. Then, a solution of 135 g of methyl methacrylate was added dropwise for 15 minutes. The mixture was allowed for reaction for 4 hours at 75° C. Then, the mixture was cooled to room temperature. The conversion was 97.9%. The resulting latex was coagulated in a 1.5% aqueous MgSO$_4$ solution at 75° C. Then, the coagulated latex was washed and dried to obtain an impact modifier in a powder form.

COMPARATIVE EXAMPLE 3

First, a rubber core was prepared by the following process. A silicone latex was prepared by dispersing (i) 157.5 g of dimethylsiloxane-diphenylsiloxane cross-linked copolymer having 1 wt % of 3-methacryloyloxypropyl group, a refractive index of 1.404, a particle size of 300 nm and 69% of an insoluble portion in toluene and (ii) 3.15 g of sodium dodecylbenzene sulfate in 976 g ion-exchanged water. To the silicone latex, 153 g of n-butyl acrylate and 4.5 g of allyl methacrylate were added and mixed at room temperature for 1 hour. A shell was formed onto the rubber core in the same manner as in Example 1. The conversion was 97.6%.

COMPARATIVE EXAMPLE 4

First, a rubber core was prepared by the following process. A silicone latex was prepared by dispersing (i) 90 g of dimethylsiloxane-diphenylsiloxane cross-linked copolymer having 1 wt % of 3-methacryloyloxypropyl group, a refractive index of 1.424, a particle size of 295 nm and 60% of an insoluble portion in toluene and (ii) 3.2 g of sodium dodecylbenzene sulfate in 970 g ion-exchanged water. To the silicone latex, 22.5 g of styrene was added and mixed at room temperature for 1 hour. The mixture was heated to 75° C. The mixture was mixed with a solution of 0.3 g of potassium persulfate in 6.4 g ion-exchanged water. The mixture was maintained at a temperature of 75° C. for 2 hours. The mixture was mixed with a solution of 1.5 g of potassium persulfate in 32.5 g ion-exchanged water. A mixed solution of 202.5 g of n-butyl acrylate and 2.5 g of triallyl isocyanurate was dropwise added to the mixture for 1 hour. The mixture was allowed for reaction at room temperature for 1 hour. A shell was formed onto the rubber core in the same manner as in Example 1. The conversion was 95.6%.

Physical Properties of Impact Modifier

Physical properties of the silicone impact modifiers obtained in the above Examples and Comparative Examples were measured as follow:

(1) Refractive Index and glass transition temperature: Samples were prepared by hot pressing the resulting impact modifiers to have a thickness of 1 mm. A refractive index was measured by using a light of wavelength 632.8 nm. A refractive index was measured with a prism coupler type laser refractometer (product name: SPA-4000) available from Sairon Tech. company. A glass transition temperature of a surface of the butylacrylate rubber was measured by dynamic mechanical analysis (product name: Rheometric Scientific, MKII).

(2) Coloration Property: Coloration property was evaluated using molded samples prepared by mixing polycarbonate, impact modifier and dye in a weight ratio of 97:3:0.2. The coloration property was visually evaluated by rating the state of coloration according to the following 5-grade criterion: 5: Very good, 4: good, 3: normal, 2: poor, 1: Very poor.

(3) Impact Resistance: Polycarbonate and impact modifier were mixed in a weight ratio of 97:3. The mixture was extruded through a twin screw extruder with Φ=45 mm in pellets. The pellets were dried at 110° C. for over 3 hours. Then, the pellets were molded into ¼" Izod test bars, using a 10-oz injection molding machine at a temperature of between 260 and 330° C. and a barrel temperature of between 60 and 100° C. The impact resistance was evaluated by Izod impact resistance test in accordance with ASTM D-256.

TABLE 1

| | | Refractive Index | Tg (° C.)[a] | Coloration | Izod Impact strength (kgf·cm/cm) | | |
|---|---|---|---|---|---|---|---|
| | | | | | 25° C. | 0° C. | −30° C. |
| Examples | 1 | 1.508 | −27 | 4 | 62.1 | 37.0 | 16.8 |
| | 2 | 1.502 | −28 | 4 | 59.0 | 31.0 | 15.0 |
| | 3 | 1.499 | −27 | 3 | 59.0 | 36.9 | 16.0 |
| | 4 | 1.502 | −16 | 4 | 62.6 | 26.6 | 14.3 |
| Comparative Examples | 1 | 1.502 | 0 | 4 | 51.7 | 14.0 | 9.7 |
| | 2 | 1.483 | −3 | 2 | 44.0 | 16.0 | 12.8 |
| | 3 | 1.472 | −33 | 1 | 56.8 | 38.5 | 16.0 |
| | 4 | 1.499 | −22 | 2 | 60.7 | 21.3 | 14.3 |

[a]The glass transition temperature of the surface of the butyl acrylate rubber.

As shown above, the impact modifiers of Examples 1-4 show a higher refractive index (more than 1.490) and a lower glass transition temperature of the butylacrylate rubber than those of Comparative Examples 1-4. Further, they show excellent coloration property and impact resistance even at a low temperature. In particular, the impact modifier of Comparative Example 4 shows poor coloration property and impact resistance at a low temperature. The impact modifier of Comparative Example 4 was prepared by graft-polymerization, instead of swelling polymerization employed by embodiments of the invention.

The foregoing description is that of embodiments of the invention and various changes, modifications, combinations and sub-combinations may be made without departing from the spirit and scope of the invention, as defined by the appended claims.

What is claimed is:

1. An impact modifier for a polymer composition, the impact modifier comprising:
   a core comprising a polyorganosiloxane, an acrylate polymer and a styrenic polymer; and
   a shell generally surrounding the core, the shell comprising a polymer attached to the core,
   wherein said core comprises said polyorganosiloxane and said acrylate polymer in a weight ratio of said polyorganosiloxane to said acrylate polymer of between about 1:6 and about 6:1.

2. The impact modifier of claim 1, wherein the core further comprises a copolymer comprising an acrylate moiety and a styrenic moiety.

3. The impact modifier of claim 1, where the core is substantially free of a copolymer comprising an acrylate moiety and a styrenic moiety.

4. The impact modifier of claim 1, wherein the polyorganosiloxane comprises at least one of a C1-C4 linear or branched alkyl, an aryl and methacryloyloxypropyl.

5. The impact modifier of claim 1, wherein the polyorganosiloxane is selected from the group consisting of polydimethylsiloxane, polydiphenylsiloxane, polymethylphenylsiloxane, polymethacryloyloxypropylsiloxane and a copolymer of at least two of the foregoing.

6. The impact modifier of claim 1, wherein the acrylate polymer comprises an alkylacrylate.

7. The impact modifier of claim 1, wherein the styrenic polymer comprises a polymerizable styrenic compound selected from the group consisting of styrene, α-methylstyrene, and vinyltoluene.

8. The impact modifier of claim 1, wherein the shell comprises a polymer comprising a substituted or unsubstituted vinyl moiety.

9. The impact modifier of claim 1, wherein the impact modifier has a refractive index from about 1.49 to about 1.59.

10. A method of making an impact modifier, the method comprising:
providing a polyorganosiloxane particle;
adding a polymerizable styrenic compound into the polyorganosiloxane particle;
polymerizing the polymerizable styrenic compound within the particle to provide a styrenic polymer;
adding a polymerizable acrylic compound into the polyorganosiloxane particle;
polymerizing the polymerizable acrylic compound within the polyorganosiloxane particle to provide an acrylate polymer; and
grafting a polymerizable compound onto the polyorganosiloxane particle to provide a shell substantially surrounding the polyorganosiloxane particle comprising the styrenic polymer and the acrylate polymer,
wherein said polyorganosiloxane particle and said acrylate polymer are present in a weight ratio of said polyorganosiloxane particle to said acrylate polymer of between about 1:6 and about 6:1.

11. The method of claim 10, wherein the polyorganosiloxane is selected from the group consisting of polydimethylsiloxane, polydiphenylsiloxane, polymethylphenylsiloxane, polymethacryloyloxypropylsiloxane and a copolymer of at least two of the foregoing.

12. The method of claim 10, wherein the polymerizable styrenic compound is selected from the group consisting of styrene, α-methylstyrene, divinylbenzene and vinyltoluene.

13. The method of claim 10, wherein the polymerizable acrylic compound comprises an alkylacrylate.

14. The method of claim 10, wherein the polymerizable compound comprises a monomer or oligomer comprising a substituted or unsubstituted vinyl moiety.

15. The method of claim 10, further comprising a step of simultaneously polymerizing the polymerizable styrenic compound and the polymerizable acrylic compound within the polyorganosiloxane particle, thereby further providing a copolymer comprising an acrylate moiety and a styrenic moiety.

16. The method of claim 10, wherein polymerizing the polymerizable styrenic compound and polymerizing the polymerizable acrylic compound are carried out at different times, thereby the resulting impact modifier is substantially free of a copolymer comprising an acrylate moiety and a styrenic moiety.

17. A polymer composition comprising:
a thermoplastic resin; and
the impact modifier of claim 1.

18. The polymer composition of claim 17, wherein the thermoplastic resin is selected from the group consisting of a vinyl chloride resin, a styrenic resin, a styrene-acrylonitrile resin, an acrylic resin, a polyester resin, an ABS resin and a polycarbonate resin.

19. The polymer composition of claim 17, wherein the impact modifier has a refractive index from about 1.49 to about 1.59 before being mixed with the polymer compound.

20. The impact modifier of claim 1, wherein said polyorganosiloxane comprises polyorganosiloxane particles and wherein said acrylate polymer and said styrenic polymer are formed within the polyorganosiloxane particles.

21. An impact modifier for a polymer composition, the impact modifier comprising:
a core comprising a polyorganosiloxane, an acrylate polymer and a styrenic polymer; and
a shell generally surrounding the core, the shell comprising a polymer attached to the core,
wherein said core comprises said acrylate polymer and said styrenic polymer in a weight ratio of said acrylate polymer to said styrenic polymer of between about 1:20 and about 1:1.

22. The impact modifier of claim 21, wherein the core further comprises a copolymer comprising an acrylate moiety and a styrenic moiety.

23. The impact modifier of claim 21, where the core is substantially free of a copolymer comprising an acrylate moiety and a styrenic moiety.

24. The impact modifier of claim 21, wherein the polyorganosiloxane comprises at least one of a C1-C4 linear or branched alkyl, an aryl and methacryloyloxypropyl.

25. The impact modifier of claim 21, wherein the polyorganosiloxane is selected from the group consisting of polydimethylsiloxane, polydiphenylsiloxane, polymethylphenylsiloxane, polymethacryloyloxypropylsiloxane and a copolymer of at least two of the foregoing.

26. The impact modifier of claim 21, wherein the acrylate polymer comprises an alkylacrylate.

27. The impact modifier of claim 21, wherein the styrenic polymer comprises a polymerizable styrenic compound selected from the group consisting of styrene, α-methylstyrene, and vinyltoluene.

28. The impact modifier of claim 21, wherein the shell comprises a polymer comprising a substituted or unsubstituted vinyl moiety.

29. The impact modifier of claim 21, wherein the impact modifier has a refractive index from about 1.49 to about 1.59.

30. A polymer composition comprising:
a thermoplastic resin; and
the impact modifier of claim 21.

31. A method of making an impact modifier, the method comprising:
providing a polyorganosiloxane particle;
adding a polymerizable styrenic compound into the polyorganosiloxane particle;
polymerizing the polymerizable styrenic compound within the particle to provide a styrenic polymer;
adding a polymerizable acrylic compound into the polyorganosiloxane particle;
polymerizing the polymerizable acrylic compound within the polyorganosiloxane particle to provide an acrylate polymer; and
grafting a polymerizable compound onto the polyorganosiloxane particle to provide a shell substantially surrounding the polyorganosiloxane particle comprising the styrenic polymer and the acrylate polymer,
wherein said acrylate polymer and said styrenic polymer are present in a weight ratio of said acrylate polymer and said styrenic polymer of between about 1:20 and about 1:1.

32. The polymer composition of claim 30, wherein the thermoplastic resin is selected from the group consisting of a vinyl chloride resin, a styrenic resin, a styrene-acrylonitrile resin, an acrylic resin, a polyester resin, an ABS resin and a polycarbonate resin.

33. The polymer composition of claim 30, wherein the impact modifier has a refractive index from about 1.49 to about 1.59 before being mixed with the polymer compound.

34. The impact modifier of claim 21, wherein said polyorganosiloxane comprises polyorganosiloxane particles and wherein said acrylate polymer and said styrenic polymer are formed within the polyorganosiloxane particles.

35. The method of claim 31, wherein the polyorganosiloxane comprises at least one of a C1-C4 linear or branched alkyl, an aryl, and methacryloyloxypropyl.

36. The method of claim 31, wherein the polyorganosiloxane is selected from the group consisting of polydimethylsiloxane, polydiphenylsiloxane, polymethylphenylsiloxane, polymethacryloyloxypropylsiloxane and a copolymer of at least two of the foregoing.

37. The method of claim 31, wherein the polymerizable styrenic compound is selected from the group consisting of styrene, α-methylstyrene, divinylbenzene and vinyltoluene.

38. The method of claim 31, wherein the polymerizable acrylic compound comprises an alkylacrylate.

39. The method of claim 31, wherein the polymerizable compound comprises a monomer or oligomer comprising a substituted or unsubstituted vinyl moiety.

40. The method of claim 31, further comprising a step of simultaneously polymerizing the polymerizable styrenic compound and the polymerizable acrylic compound within the polyorganosiloxane particle, thereby further providing a co-polymer comprising an acrylate moiety and a styrenic moiety.

41. The method of claim 31, wherein polymerizing the polymerizable styrenic compound and polymerizing the polymerizable acrylic compound are carried out at different times, thereby the resulting impact modifier is substantially free of a copolymer comprising an acrylate moiety and a styrenic moiety.

42. The method of claim 10, wherein the polyorganosiloxane comprises at least one of a C1-C4 linear or branched alkyl, an aryl, and methacryloyloxypropyl.

* * * * *

UNITED STATES PATENT AND TRADEMARK OFFICE
CERTIFICATE OF CORRECTION

PATENT NO. : 7,541,401 B2  Page 1 of 1
APPLICATION NO. : 11/323646
DATED : June 2, 2009
INVENTOR(S) : Han Su Lee et al.

It is certified that error appears in the above-identified patent and that said Letters Patent is hereby corrected as shown below:

Title Page under:

OTHER PUBLICATIONS should read as follows:

International Search Report for copending International Application No. PCT/KR2005/001831, mailed on September 29, 2005

Signed and Sealed this

Tenth Day of November, 2009

David J. Kappos
*Director of the United States Patent and Trademark Office*